(12) United States Patent
Hepworth et al.

(10) Patent No.: US 8,834,980 B2
(45) Date of Patent: Sep. 16, 2014

(54) BIOCOMPOSITE MATERIAL

(75) Inventors: David Hepworth, Fife (GB); Eric Whale, Fife (GB)

(73) Assignee: Cellucomp Limited, Burntisland, Fife (GB)

(*) Notice: Subject to any disclaimer, the term of this patent is extended or adjusted under 35 U.S.C. 154(b) by 64 days.

(21) Appl. No.: 11/791,221

(22) PCT Filed: Nov. 10, 2005

(86) PCT No.: PCT/GB2005/004322
§ 371 (c)(1), (2), (4) Date: May 22, 2007

(87) PCT Pub. No.: WO2006/056737
PCT Pub. Date: Jun. 1, 2006

(65) Prior Publication Data
US 2008/0075900 A1    Mar. 27, 2008

(30) Foreign Application Priority Data
Nov. 23, 2004    (GB) .................................. 0425691.3

(51) Int. Cl.
| | | |
|---|---|---|
| *B32B 1/08* | (2006.01) | |
| *D21H 11/20* | (2006.01) | |
| *C08L 1/02* | (2006.01) | |
| *D21C 9/00* | (2006.01) | |
| *C08J 5/04* | (2006.01) | |
| *B32B 1/02* | (2006.01) | |
| *D21H 27/34* | (2006.01) | |
| *D21C 5/00* | (2006.01) | |

(52) U.S. Cl.
CPC ................ *D21C 9/002* (2013.01); *D21H 11/20* (2013.01); *D21H 27/34* (2013.01); *D21C 5/005* (2013.01); *C08L 1/02* (2013.01); *C08J 5/045* (2013.01)

USPC ....... 428/35.7; 428/34.1; 428/34.2; 428/35.9; 428/36.9

(58) Field of Classification Search
USPC ..................... 428/34.1, 34.2, 35.7, 35.9, 36.9
See application file for complete search history.

(56) References Cited

U.S. PATENT DOCUMENTS 3,850,862 A * 11/1974 Clendinning et al. ......... 523/128
4,269,605 A *  5/1981 Dean et al. ...................... 436/67
(Continued)

FOREIGN PATENT DOCUMENTS

| EP | 1469126 | 10/2004 |
|---|---|---|
| WO | WO 94/15484 | 7/1994 |
| WO | WO 00/15667 | 3/2000 |

OTHER PUBLICATIONS

Merriam—Webster's Collegiate Dictionary, Tenth Edition, p. 658.*

(Continued)

*Primary Examiner* — Marc Patterson
(74) *Attorney, Agent, or Firm* — Nixon & Vanderhye P.C.

(57) ABSTRACT

A biocomposite material (1) and methods of production thereof are described. The biocomposite material (1) exhibits a physical stiffness, strength and toughness comparable to known glass fiber composites while its composition makes it inherently impermeable to water. A general formulation for the biocomposite material (1) is given by the expression: $Cel_{(1-x-y)} HPI_x HPO_y$, where "Cel" represents cellulose fragments (2), "HPI" represents hydrophilic binders (4), "HPO" represents hydrophobic binders (5) and (x) and (y) quantify the percentage by weight of the hydrophilic (4) and hydrophobic binders (5) present within a material, respectively. The described properties of the biocomposite material (1) are achieved when (x) is within the range of from 0.05 to 0.55 and (y) is within the range of from 0.05 to 0.65.

20 Claims, 5 Drawing Sheets

(56) References Cited

U.S. PATENT DOCUMENTS

Figure 1:
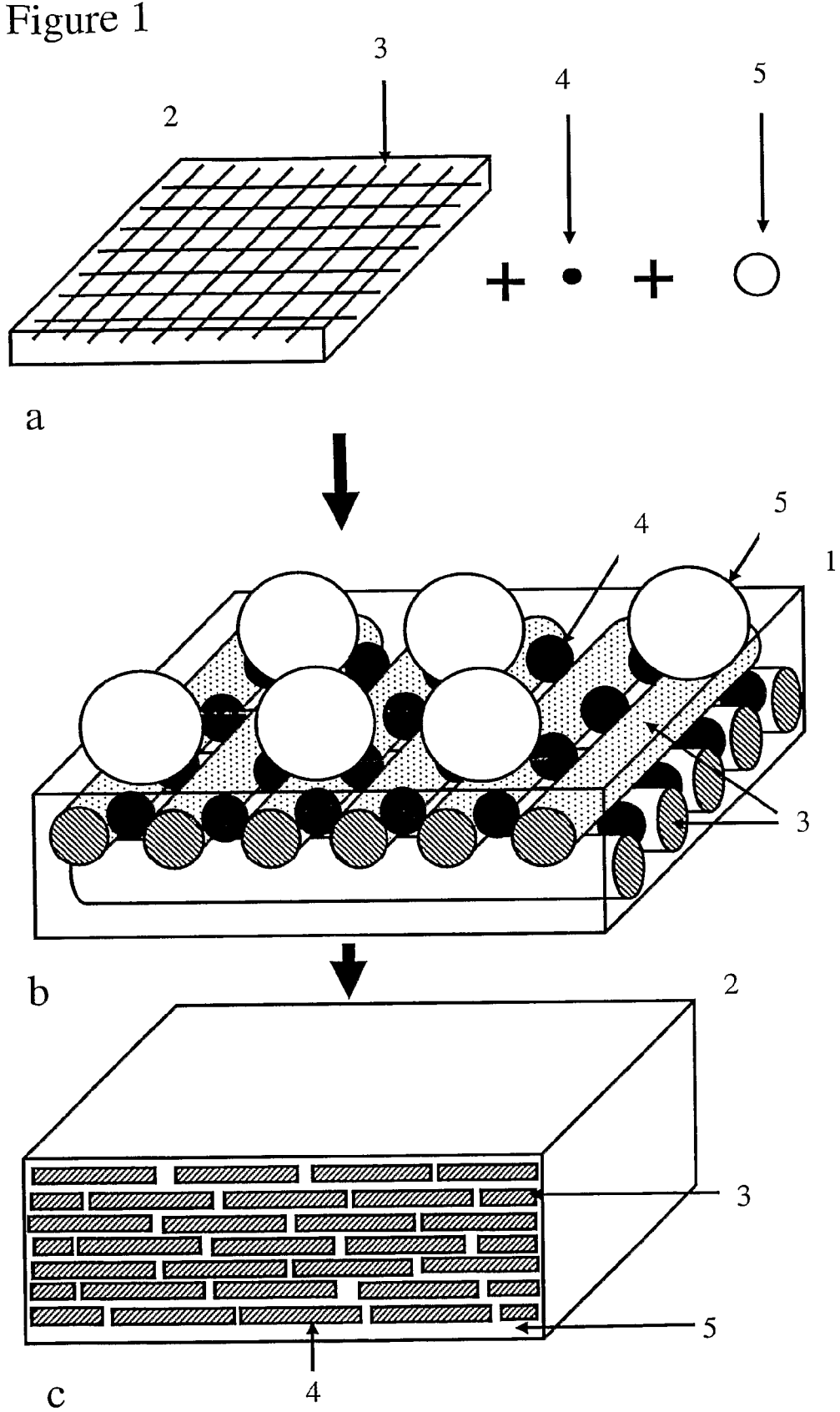

| | | | |
|---|---|---|---|
| 4,374,702 A * | 2/1983 | Turbak et al. | 162/100 |
| 4,487,634 A * | 12/1984 | Turbak et al. | 106/163.01 |
| 4,525,492 A * | 6/1985 | Rastall et al. | 521/181 |
| 4,609,431 A | 9/1986 | Grose et al. | 162/135 |
| 4,742,164 A * | 5/1988 | Iguchi et al. | 536/56 |
| 5,548,069 A * | 8/1996 | Koshijima et al. | 530/500 |
| 5,817,381 A * | 10/1998 | Chen et al. | 428/34.8 |
| 6,103,790 A * | 8/2000 | Cavaille et al. | 524/13 |
| 6,214,163 B1 * | 4/2001 | Matsuda et al. | 162/9 |
| 6,350,935 B1 * | 2/2002 | Bennett et al. | 800/290 |
| 7,002,059 B1 * | 2/2006 | Burrell et al. | 800/298 |
| 7,060,874 B2 * | 6/2006 | Wilkins | 800/290 |

OTHER PUBLICATIONS

Bowyer, J. L., et al., "Forest Products and Wood Science: An Introduction", 5$^{th}$ Edition Wiley-Blackwell, Apr. 2007, p. 54.

* cited by examiner

BIOCOMPOSITE MATERIAL

The present invention relates to the field of biocomposite materials and in particular to biocomposite materials produced through the extraction of cellulose from plants.

The use of plant based long fibres such as hemp, flax, kanaf, cotton, jute, sisal and coconut fibre mats as reinforcement for polymer matrices such as polypropylene and epoxy resins are well known to those skilled in the art. These composites utilise fibres which are typically several centimeters long and hundreds of micrometers wide (usually in the form of bundles of several bast fibre cells). Primarily these plant based long fibres have found applications in the automotive industry, but only for non-structural applications such as door liners and parcel shelves, due in part to the poor surface finish achieved with these materials, but mainly because of their reduced toughness when compared to glass fibre reinforced polymers (GFRP). These materials are also known to exhibit inherent problems with water absorption and odour release.

Shorter plant fibres, mainly derived from wood pulp, have also been used by those skilled in the art as reinforcements for plastics. Traditional materials made from these fibres include Formica, medium density fibre board (MDF) and high density fibre board (HDF). However, these materials suffer from similar problems to the long plant fibre composites, being either brittle and water proof (e.g. Formica) or alternatively tough but water absorbent (e.g. MDF).

Recently it has been discovered that high performance materials can be produced by impregnating mats of fibrillated wood pulp fibres with phenolic resin (see Nakagaito et al "The Effect Of Morphological Changes From Pulp Fiber Towards Nano-Scale Fibrillated Cellulose On The Mechanical Properties Of High-Strength Plant Fibre Composites" Applied Physics A: Materials Science & Processing Vol. 78 Page 547-552 (2004) and Yano et al "Bio-Composites Produced From Plant Microfiber Bundles With A Nanometer Unit Web-Like Network" Journal Materials Science Vol. 39 Page 1635-1638 (2004)). The fibrillation of the wood fibres acts to partially separate cellulose microfibrils within the cell walls so that the wood fibres become more absorbent and the surface 'roughened' so that there is a greater surface area for interaction with other fibres and binders. In general these materials are stiff and strong but only achieve toughness equal to or greater than glass fibre if the resin content is kept to less than 3%, so resulting in a highly hygroscopic material which losses strength as it absorbs water. Also the method of manufacturing the materials, which involves impregnating sheets of dry fibres with dilute resin and then stacking many thin (<0.5 mm) sheets of impregnated material on top of one another and hot pressing at high pressure, is a very time consuming process, taking over 100 hours. This severely increases manufacturing time compared to GFRP and so greatly limits the potential range of applications for these materials.

U.S. Pat. No. 4,609,431 in the name of Congoleum Corporation teaches of a tough, water proof material produced by mixing lower quantities of wood pulp fibres (less than 30%) with glass fibres and thereafter embedding these within a complex of rubber materials and inorganic fillers. However, these materials exhibit a lower stiffness than GFRP which limits their applications to surface finishes. Furthermore, such materials can only be classified as a partial biocomposite material due to the significant proportion of GFRP present.

A further method of forming composite materials is described by Matsumura et al "Cellulosic Nanocomposites I Thermally Deformable Cellulose Hexanoates From Heterogeneous Reaction" J. Applied Polymer Science Vol. 78 Page 2242-2253 (2000). This method involves the chemical treatment of the surface of wood fibres so as to cause esterification of the wood fibres. The esterified fibres are then hot pressed together to form consolidated sheets. Although these materials are water resistant they exhibit only limited modulus and strength.

The prior art also teaches that it is possible to completely separate cellulose microfibrils from animal and bacterial sources which are much smaller and thinner than the previously discussed plant fibres (being 5-20 nm in diameter), see PCT Application No. PCT/NL92/00206 in the name of DSM N.V. and PCT Application No. PCT/US89/02355 in the name of Brown, respectively. Composite materials made from these animal and bacterial cellulose microfibrils have been shown to exhibit high stiffness and good strength but have inherently low failure strains which results in them being brittle in nature.

Improvements to these composite materials have been achieved by mixing the cellulose microfibrils with low modulus resins/binders so as to produce a tougher composite material. However, the tensile modulus of these composite materials is less than 5 GPa, which is no better than the levels achieved within non-reinforced plastics, and is too low to allow them to be employed within many structural applications.

Within these composite materials it is also desirable to achieve high volume fractions of the cellulose microfibrils within the finished composites. However, this in itself is problematic because even when a few percent, by weight, of free cellulose microfibrils are added to a liquid, the viscosity of the liquid increases dramatically. Indeed the liquid quickly becomes a gel if the cellulose microfibrils begin to interact with one another (at less than 15% microfibril content).

To date the only way to achieve the high volume fractions, which are necessary to produce high stiffness, high strength composite materials, has been to employ a method described by Nakagaito et al "Bacterial Cellulose: The Ultimate Nano-Scalar Cellulose Morphology For The Production Of High-Strength Composites" Applied Physics A: Materials Science & Processing DOI: 10.1007/s00339-004-2932-3 (2004). This method involves the formation of mats of the cellulose microfibrils by precipitation from water, drying off of the water (or sequential replacement of the water with an organic solvent) and then impregnating the resultant material with a resin (often under high pressure). This is a complex and time consuming process involving many individual manufacturing steps and so the composite materials produced by this route consume large amounts of energy during manufacturing and therefore are not economical for commercial scale production.

It is also known to those skilled in the art that cellulose microfibrils can be found within almost all plant cell walls. Indeed Dufresne et al "Mechanical behaviour of sheets prepared from sugar beet cellulose microfibrils" J Appl Polym Sci Vol. 64 Page 1185-1194 (1997) teach that these cellulose microfibrils can be extracted from these plant cells using a combination of chemical degradation of plant material and high pressure homogenisation. The cellulose microfibrils can then be used to produce composite materials, in a similar way to those described previously in connection with animal and bacterial cellulose microfibrils, as described in Dufresne A et al "Cellulose Microfibrils From Potato Tuber Cells Processing And Characterisation Of Starch-Cellulose Microfibril Composites" J. Applied Polymer Science Vol. 76 Page 208-2092 (2000). To date the composite materials produced by this method exhibit very poor mechanical properties with low stiffness and poor strength. This is partly due to the low upper limit of 15% of the cellulose microfibrils that can be mixed with the liquid resin, before it becomes a solid gel, as discussed above.

It is therefore an object of an aspect of the present invention to provide a biocomposite material that exhibits a physical stiffness, strength and toughness comparable to known glass fibre composites but which is also inherently impermeable to water.

It is a further object of an aspect of the present invention to provide a biocomposite material that exhibits the above properties and which can be produced economically on a commercial scale.

For clarity purposes it should be noted that the stiffness of a material is quantified by the Young's modulus exhibited by the material while the toughness of a material is quantified by the amount of energy absorbed per unit volume of the material up to the point of failure. Furthermore, an impermeable material is defined as a material that has a significantly slower rate of water uptake when completely immersed in water when compared to cellulose or previously known cellulose composites.

In the following formulations "Cel" represents cellulose fragments, "HPI" represents hydrophilic binders, "HPO" represents hydrophobic binders and x and y quantify the percentage by weight of the hydrophilic and hydrophobic binders present within a material, respectively.

SUMMARY OF THE INVENTION

According to a first aspect of the present invention there is provided a biocomposite material comprising a plurality of cellulose fragments made up of a network of cellulose microfibrils, a plurality of hydrophilic binders located within the network of cellulose microfibrils and a plurality of hydrophobic binders arranged to interact with the hydrophilic binders so as to encapsulate the plurality of cellulose fragments.

The above arrangement ensures good stress transfer from the hydrophobic binders through the hydrophilic binders to the cellulose microfibrils so providing the biocomposite material with the desired stiffness, strength and toughness. By arranging the hydrophobic binders so as to encapsulate the cellulose fragments, the biocomposite material is also rendered impermeable to water.

Most preferably the biocomposite material of the first aspect of the present invention has the general formulation $Cel_{(1-x-y)} HPI_x HPO_y$ where x is within the range of from 0.05 to 0.55 and y is within the range of from 0.05 to 0.65.

According to a second aspect of the present invention there is provided a biocomposite material that is impermeable to water comprising a plurality of cellulose fragments made up of a network of cellulose microfibrils, a plurality of hydrophilic binders and a plurality of hydrophobic binders having the general formulation $Cel_{(1-x-y)} HPI_x HPO_y$ where x is within the range of from 0.05 to 0.55 and y is within the range of from 0.05 to 0.65.

Preferably the plurality of hydrophilic binders are located within the network of cellulose microfibrils and the plurality of hydrophobic binders are arranged to interact with the hydrophilic binders so as to encapsulate the plurality of cellulose fragments.

Most preferably the biocomposite material of the first and second aspects of the present invention exhibits a stiffness in the range from 5 GPa to 90 GPa.

According to a third aspect of the present invention there is provided a biocomposite material that is impermeable to water and which exhibits a stiffness in the range from 5 GPa to 90 GPa.

Preferably the biocomposite material of the third aspect of the present invention comprises a plurality of cellulose fragments made up of a network of cellulose microfibrils, a plurality of hydrophilic binders located within the network of cellulose microfibrils and a plurality of hydrophobic binders arranged to interact with the hydrophilic binders so as to encapsulate the plurality of cellulose fragments.

Preferably the biocomposite material of the third aspect of the present invention has the general formulation $Cel_{(1-x-y)} HPI_x HPO_y$ where x is within the range of from 0.05 to 0.55 and y is within the range of from 0.05 to 0.65

Most preferably the cellulose fragments of the various aspects of the present invention are arranged in a randomly orientated manner.

Most preferably the biocomposite material of the various aspects of the present invention exhibit a tensile strength in the range from 60 MPa to 1 GPa.

Most preferably the biocomposite material of the various aspects of the present invention exhibit a bending strength in the range from 60 MPa to 600 MPa.

Most preferably the biocomposite material of the various aspects of the present invention exhibits a stiffness in the range from 14 GPa to 21 GPa.

Most preferably the biocomposite material of the various aspects of the present invention exhibits a strength in the range from 200 MPa to 300 MPa.

Most preferably the biocomposite material of the various aspects of the present invention exhibit a toughness in the range from $3 \text{ MJm}^{-3}$ to $10 \text{ MJm}^{-3}$.

Preferably the hydrophilic binders comprise a hydrophilic or substantially hydrophilic polymer. The hydrophilic polymer may comprise a hemicellulose, an acrylic resin or alternatively a partially hydrolysed polyvinyl acetate. Optionally the hydrophilic polymer comprises a biological hydrophilic polymer e.g. gelatine and guar gum.

Optionally the hydrophobic binders comprise a hydrophobic polymer. The hydrophobic polymer may comprise an epoxy such as a bisphenol-A or a modified bisphenol A epoxy.

Alternatively the hydrophobic binders comprises a binder selected from the group comprising polyurethanes, phenolic resins, acrylics and siloxanes.

According to a fourth aspect of the present invention there is provided a monolithic structure comprising two or more layers wherein at least one layer comprises a biocomposite material in accordance with any of the first to third aspects of the present invention.

The formation of a monolithic layered structure provides a structure within which the mechanical properties can be gradated, as appropriate. As curing results in there being no distinct interfaces between the layers, these monolithic structures experience no compromise to their mechanical properties.

Optionally the monolithic structure comprises at least one layer of a plastic material. Preferably the plastic material comprises a carbon fibre reinforced material.

According to a fifth aspect of the present invention there is provided a laminate structure comprising two or more layers wherein at least one layer comprises a biocomposite material in accordance with any of the first to fourth aspects of the present invention.

Optionally the laminate structure comprises at least one layer of a plastic material. Preferably the plastic material comprises a carbon fibre reinforced material.

Preferably the laminate structure comprises one or more layers of resin located between the two or more layers of the structure.

Preferably the one or more layers of resin comprise a hydrophobic resin such as epoxy or polyurethane.

According to a sixth aspect of the present invention there is provided a tube, suitable for use in a fishing rod, the tube comprising a biocomposite material in accordance with the first to fifth aspects of the present invention.

According to a seventh aspect of the present invention there is provided a method of producing cellulose fragments, comprising a network of cellulose microfibrils, from a plant material comprising the steps of:
1) Producing a first pulp of the plant material;
2) Mixing a first pulp with a bleach solution so that a quantity of pectins and hemicelluloses present within the plant material are dissolved within a resultant solution;
3) Producing a second pulp by removing the bleach from the resultant solution; and
4) Reducing the water content present within the second pulp.

Optionally the first pulp is filtered and washed in water before mixing with the bleach solution; Preferably the step of producing the first pulp comprises the steps of:
1) Heating the plant material so as to soften the plant material;
2) Filtering any resultant liquid from the softened plant material; and
3) Blending the resultant residue with water.

Optionally the step of producing the first pulp further comprises chopping of the plant material before heating.

Preferably the plant material is heated to temperature between 85° C. and 120° C. at atmospheric pressure.

Optionally the blended resultant residue and water is allowed to stand for a period of at least one day. Optionally a micro-organism is added to the blended resultant residue so as to aid the breakdown of the plant material. The micro-organism optionally comprises bacterium or yeast.

Preferably the mixture of the first pulp and the bleach solution is allowed to stand for a period of at least thirty minutes so as to form the resultant solution. This has been found to have the effect of aiding the reduction of the particle size produced.

Preferably the step of producing a second pulp comprises washing and filtering the resultant solution so as to remove the bleach and so produce a second residue.

Optionally the step of producing the second pulp further comprises the step of homogenising the second residue.

Preferably the second residue is homogenised by mixing the second residue within a high shear mixing process. Alternatively the second residue is homogenised by pressurising the second residue at a pressure between 500 and 1000 bar.

Alternatively, the step of producing a second pulp comprises homogenising the resultant solution and then washing and filtering the homogenised resultant solution so as to remove the bleach.

Preferably the step of reducing the water content present within the second pulp comprises pressing the second pulp.

Most preferably the pressing of the second pulp results in the second pulp comprising at least 40% water by weight.

According to an eighth aspect of the present invention there is provided a method of producing a biocomposite material that is impermeable to water comprising the steps of:
1) Producing a plurality of cellulose fragments, comprising a network of cellulose microfibrils;
2) Incorporating a plurality hydrophilic binders within the plurality of cellulose fragments; and
3) Encapsulating the plurality of cellulose fragments and the plurality of hydrophilic binders within a plurality of hydrophobic binders.

Most preferably the step of producing the plurality cellulose fragments comprises the method of the seventh aspect of the present invention.

Preferably the step of incorporating the plurality hydrophilic binders within the cellulose fragments comprises:
1) Re-hydrating the cellulose fragments with a first emulsion comprising the hydrophilic binders so as to produce a paste; and
2) Removing excess water and excess hydrophilic binders from the paste.

Preferably the step of encapsulating the plurality of cellulose fragments and the plurality of hydrophilic binders comprises:
1) Producing a second emulsion comprising the plurality of hydrophobic binders;
2) Mixing the second emulsion with the paste containing the hydrophilic binder so as to produce a composite paste material;
3) Applying pressure to the composite paste material;
4) Removing water from the composite paste material; and
5) Curing the dried composite paste material.

Preferably the production of the second emulsion involves mixing the hydrophobic binders with a surfactant and water.

Most preferably the surfactant is non-ionic.

Alternatively the production of the second emulsion comprises the steps of:
1) Obtaining a sample of the second pulp;
2) Homogenising the sample so as to reduce the plurality of cellulose fragments to individual cellulose fibrils and microfibrils; and
3) Mixing the hydrophobic binders with the homogenised sample.

Preferably the ratio of the hydrophobic binders to the water within the second emulsion is between 10:1 and 1:5. Most preferably the ratio is between 10:1 and 5:1.

Preferably the step of removing water further comprises air drying the composite paste material at a temperature below 120° C. Optionally the step of removing water from the composite paste material comprises applying a vacuum to the paste.

Preferably the curing of the dried composite paste material comprises a first curing of the dried composite paste material at a temperature within the range from ambient to 180° C. but ideally in the range 80-160° C.

Optionally the curing of the dried composite paste material further comprises a second curing of the dried composite paste material at a temperature within the range 120-180° C.

SPECIFIC DESCRIPTION

Figure 2:
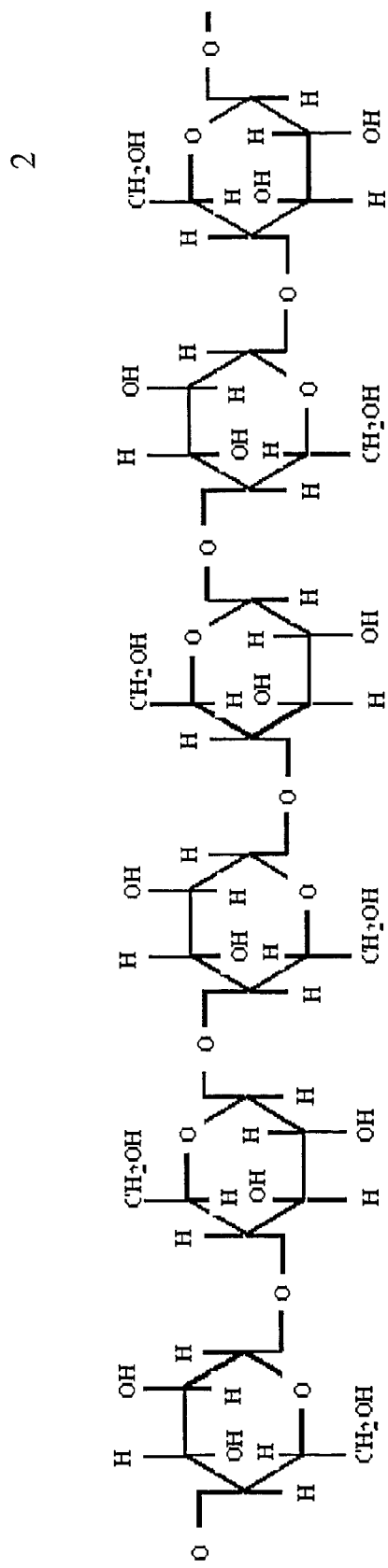
Figure 3:
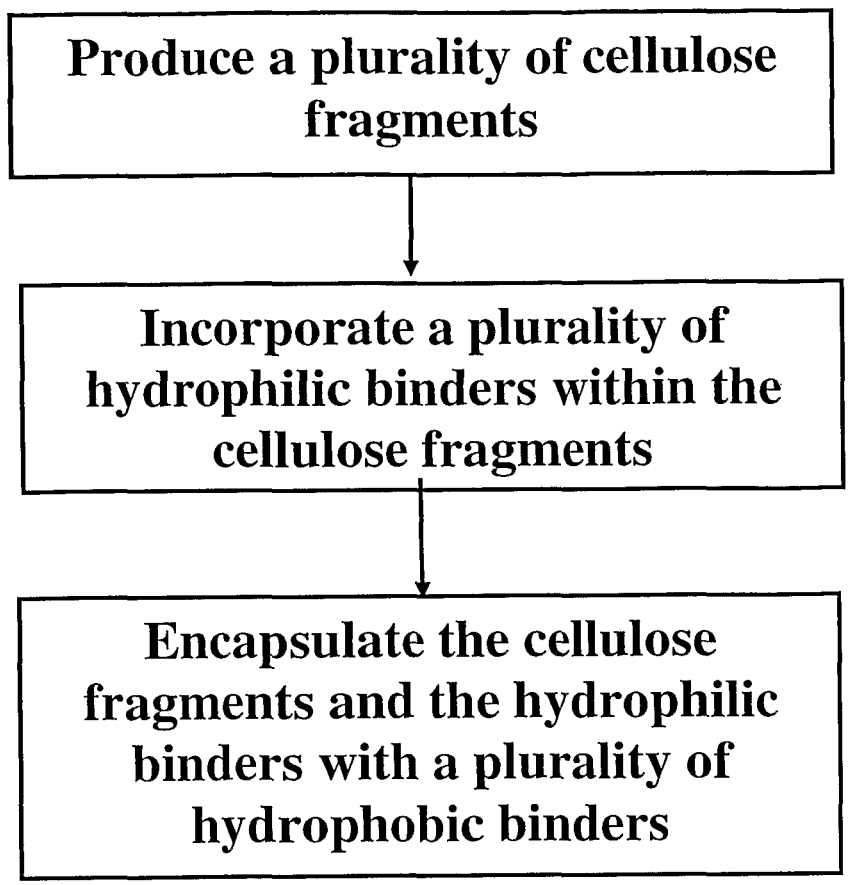
Figure 4:
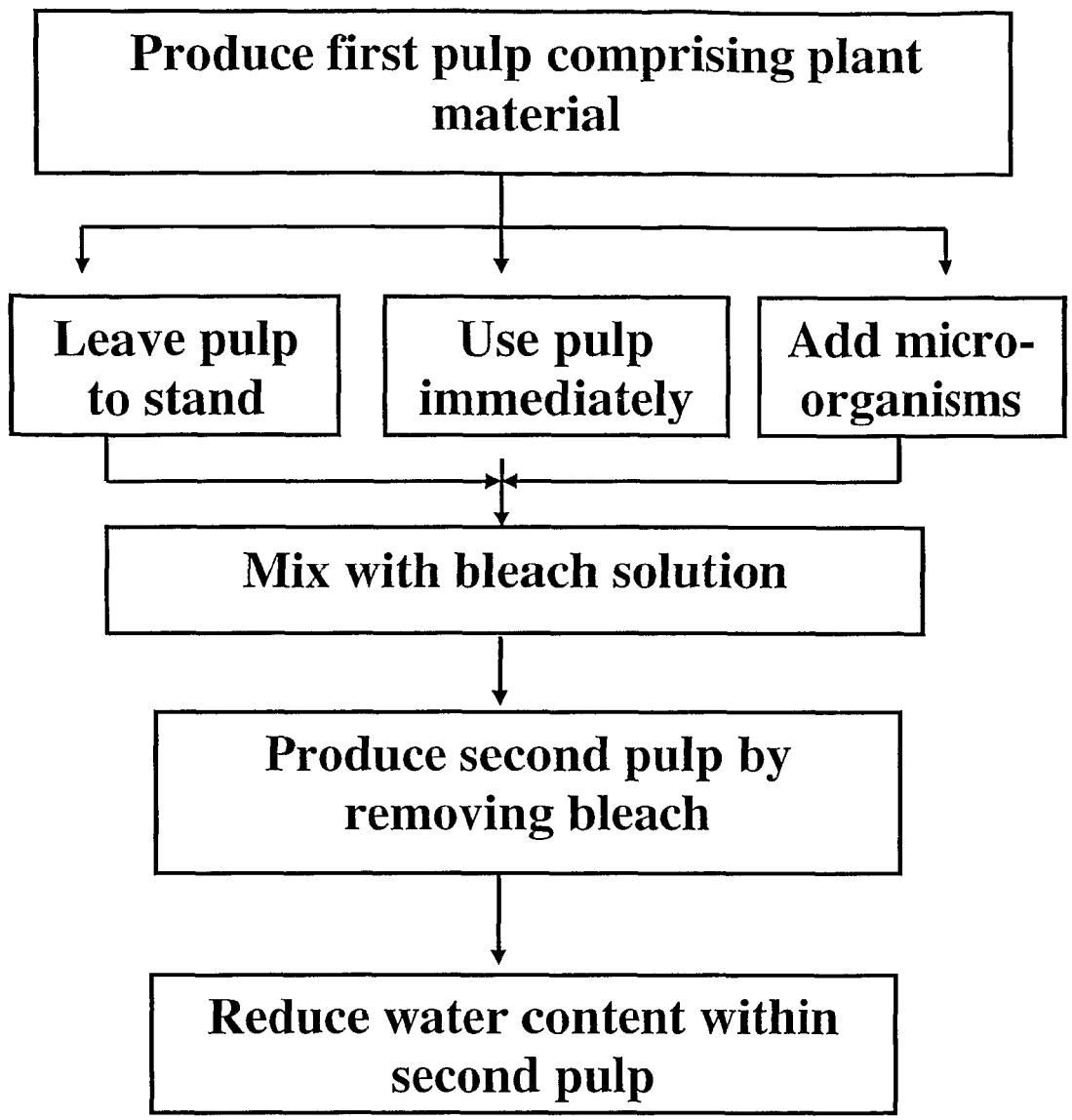
Figure 5:
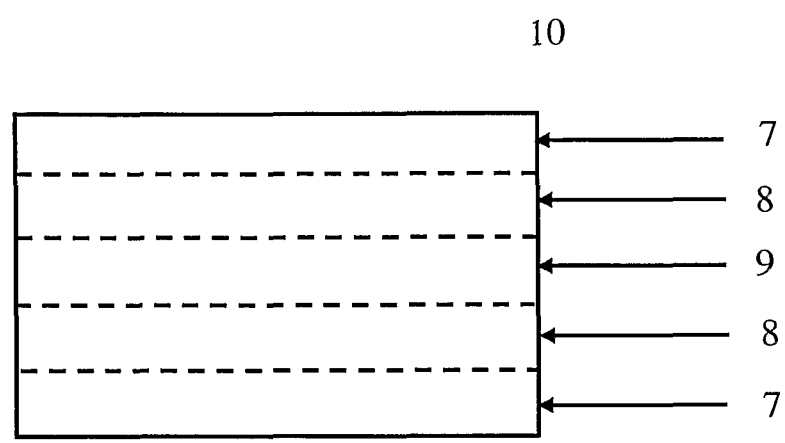
Figure 6:
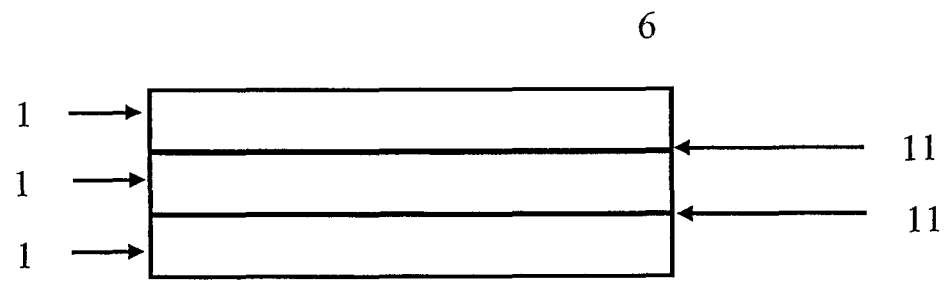

Aspects and advantages of the present invention will become apparent upon reading the following detailed description and upon reference to the following drawings in which:

FIG. 1 presents a series of schematic representations of the structure of a biocomposite material in accordance with aspects of the present invention;

FIG. 2 presents a schematic representation of the chemical structure of a cellulose fragment employed within the biocomposite material of FIG. 1;

FIG. 3 presents a flow chart of the method for producing the biocomposite material of FIG. 1;

FIG. 4 presents a flow chart of the method for producing cellulose fragments as employed within the method of FIG. 3;

FIG. 5 presents a schematic representation of a monolithic structure in accordance with an aspect of the present invention; and FIG. 6 presents a schematic representation of a laminate structure in accordance with an aspect of the present invention;

A detailed description of a biocomposite material 1 in accordance with aspects of the present invention shall now be described with reference to FIGS. 1 and 2.

From FIG. 1 the biocomposite material 1 can be seen to comprise a plurality of cellulose fragments 2 in the form of a network of cellulose microfibrils 3. The cellulose fragments 2 can be seen to be infiltrated with a hydrophilic (or substantially hydrophilic) binder 4 and encapsulated within a hydrophobic binder 5. In practice the cellulose fragments 2 can range from comprising a mix of individual cellulose microfibrils (typically ~20 nm in diameter) to sections of cellulose cells typically ~50 μm in length and breadth and less than 1 μm in thickness themselves made up of a number of cellulose microfibrils 3. A schematic representation of the chemical structure of cellulose is presented in FIG. 2.

In the present embodiment the hydrophilic binder 4 comprises partially hydrolysed polyvinyl acetate. Partially hydrolysed polyvinyl acetate is known by those skilled in the art to be a substantially hydrophilic polymer that readily forms micelles in water. The diameter and nature of the partially hydrolysed polyvinyl acetate particles is such that they locate within the cellulose fragment 2, as shown in FIG. 1(b).

In the present embodiment the hydrophobic binder 5 comprises an epoxy resin. Cured epoxy resins are known by those skilled in the art to be hydrophobic in nature. The uncured epoxy resin is therefore formed into micelles with a typical diameter of ~0.5-2 μm. The diameter and nature of the epoxy particles is such that these particles cannot locate within the cellulose fragments 2. In the cured material, FIG. 1(c), the polymer particles fuse and the epoxy interacts with the partially hydrolysed polyvinyl acetate with the result that there is a transfer of stress from the cured epoxy matrix via the partially hydrolysed polyvinyl acetate to the cellulose fragments 2. This interaction provides the composite material with the physical parameters as detailed in Table 1 below which relates in particular to a material that comprises 25% partially hydrolysed polyvinyl acetate by weight and 25% epoxy by weight and in which the cellulose fragments are randomly orientated throughout the composite material. For comparison purposes Table 1 also includes typical results for alternative materials known to those skilled in the art i.e. GFRP and so called waterproof hemp (hemp with a 30% polypropylene fibre content).

A further function of the epoxy is that it effectively encapsulates the cellulose fragments 2 and hence the partially hydrolysed polyvinyl acetate located therein, so rendering the biocomposite material 1 impermeable to water.

The precise physical properties of the biocomposite material 1 outlined in Table 1 can be varied by altering the relative proportion by weight of both the partially hydrolysed polyvinyl acetate and the epoxy. It has been found that a biocomposite material that is impermeable to water can be produced when the partially hydrolysed polyvinyl acetate comprise between 5% and 55% of the total weight of the material while the epoxy can be varied within a range of 5% to 65% of the total weight of the material. It has been possible to produce these biocomposite materials in samples in excess of 4 mm thick.

Methods for producing the biocomposite material 1 shall now be described in detail, a flow chart for which is presented in FIG. 3.

The first stage of this process involves the production of the cellulose fragments 2, comprising a network of cellulose microfibrils 3 which provides the framework for the biocomposite material 1. The production of the cellulose fragments 2 is achieved by the following process, a flow chart for which is provided in FIG. 4:

1) A plant material is coarsely chopped into a plurality of pieces. In this particular example the plant material comprises chopped carrot.
2) The coarsely chopped carrot is then hydrothermally treated, at a temperature between 85-120° C. at atmospheric pressure, until it begins to soften. Optionally steam and pressures above atmospheric pressures may be utilised to soften the carrots.
3) The resultant cooking liquid is then drained off from the softened coarsely chopped carrot.
4) Fresh water is then added to the residue material and this material is then processed in high speed blender for approximately 3-5 minutes so as to increase the available surface area of the material.
5) Optionally, the material can then be immediately used as described below. Alternatively, the material can be allowed to stand for a period of time before use with or without the addition of a micro-organism e.g. bacteria or yeast. Such additional steps further assist in the breakdown of the carrot material.
6) The resultant pulp produced by the blending process may then be filtered and washed with clean water.
7) Next the residue Produced within the previous stage is mixed with a concentrated bleach solution and thereafter allowed to stand for 30 minutes, although longer time periods may be employed. The addition of bleach acts to kill of any unwanted micro-organisms while ensuring that a significant quantity of the pectins and hemicelluloses present within the original carrot material is dissolved within the resultant solution.
8) The bleach is then removed by washing and filtering. Thereafter, water is added to the residue which is then homogenised by passing through a high shear in-line mixer or a high shear batch mixer. This involves the passing of the residue through a fine mesh under high shearing conditions so as to break down the cellular material in the residue so as to produce a pulp containing a range of cellulose fragments i.e. sized from individual cellulose microfibrils (on a scale of 20 nm in diameter) up to sections of cellulose cells typically 50 μm in length and breadth and less than 1 μm in thickness depending on the precise processing conditions.
9) It is then required to reduce the water content within the resultant pulp. This is achieved by wrapping the pulp in a fine meshed bag and then pressing within a standard mechanical press. The resulting pressed pulp provides the required cellulose fragments 2 and in particular comprises 1-30% cellulose by weight, and so behaves as a solid, feeling dry to the touch. It is essential that there remains enough water present within the cellulose fragments 2 so as to prevent the cellulose fragments 2 from interacting too strongly and therefore forming a rigid solid.

Although the above stage employs carrot plant material, a range of alternative plant materials may equally well be employed in order to obtain cellulose fragments 2, comprising the network of cellulose microfibrils 3. These include, but are not limited to turnip, swede, apple, sugar beet, beetroot and onions.

As an alternative to hydrothermally treating the coarsely chopped carrot, as outlined within step 2 above, the chopped carrot may simply be heated in a microwave or infrared heater until the required softening occurs.

As an alternative to the homogenisation process of step 8 above, the homogenised filtrate may be produced by subjecting the filtrate to a single pass through a high pressure homogeniser (at between 500-1000 bar).

In a further alternative to the above step 8 a sample of the homogenised pulp is taken before the water content within the pulp is reduced by pressing. This sample of pulp is then available for employment within a later stage of the process, as described in detail below.

The second stage of the process for producing the biocomposite material 1 involves the incorporation of a hydrophilic (or substantially hydrophilic) binder 4 within the cellulose fragments 2. This can be achieved by the following process:

1) The cellulose fragments 2, comprising a network of cellulose microfibrils 3 are re-hydrated with an emulsion or a particulate suspension of hydrophilic matrix material, namely PVA which exhibits high strains to failure (greater then 6%) and a low modulus of between 200-1000 MPa when formed into a solid. Depending upon the particular requirements of the biocomposite material 1 the emulsion produced at this stage can comprise between 5 and 60% resins (and/or glues) by weight and between 40 and 95% water. For the biocomposite material detailed within Table 1 the proportion of total resin (and/or glues) by weight was within the range of 45-55%.
2) The final step of this stage involves any excess water and PVA material that has not penetrated into the cellulose matrix being removed. This is achieved by pressing the material (under a significant pressure) over a filter means. A soft smooth paste is then produced.

Although the above stage employs PVA as the hydrophilic binder any other hydrophilic binding material that can be incorporated within the cellulose fragments 2 may equally well be employed. Suitable alternative hydrophilic binding materials include acrylic resins and biological hydrophilic polymers such as gelatines and gaur gum.

The final stage of the process for producing the biocomposite material 1 involves the encapsulation of the cellulose fragments 2 and the PVA particles with a hydrophobic binder 5. This can be achieved by the following process:

1) An emulsion is formed by adding an epoxy resin to water through the employment of a non-ionic surfactant (e.g. Triton®-X octyl phenol ethoxylate). Typically the ratio of the epoxy particles to water is between 10:1 and 1:5. For the biocomposite material detailed in Table 1 the ratio of the epoxy particles to water was 1:1.
2) The emulsion is then added to the soft smooth paste produced within the second stage of the process so as to produce a thick smooth paste of uncured wet materials.
3) Pressure is then applied to the thick smooth paste so as to ensure that the cellulose fragments are forced together and that there is some mixing of the materials at the nanoscopic level.
4) Residual water is then removed from the thick smooth paste by air drying at a temperature up to 110° C.
5) The dried material is then subjected to post drying curing in an oven at between 80-160° C.

A further improvement in the stiffness and strength of the biocomposite material 1 can be achieved by employing a second post drying curing cycle in an oven at between 120-180° C.

Although the above stage employs an epoxy (e.g. bisphenol-A or a modified bisphenol A epoxy) as the hydrophobic binding material any other hydrophobic binding material that acts to encapsulate the cellulose fragments 2 and the hydrophilic binders 4 may equally well be employed. Suitable alternative hydrophobic binding materials include but are not limited to polyurethanes, phenolic resins, acrylics and siloxanes.

The step of the removing the residual water from the thick smooth paste may be achieved through the application of a vacuum, in conjunction with, or as an alternative to the process of air drying.

An alternative method for producing the cellulose fragments 2 from carrots shall now be described. The alternative method comprises the steps of:

1) Hydro thermally treating whole carrots at a temperature between 85° C. and 120° C. at atmospheric pressure until they soften. Optionally steam and pressures above atmospheric pressure may be used to soften the carrots.
2) The resultant cooking liquid is then drained off from the carrots.
3) Fresh water is then added to the residue material and this material is then processed in a high shear mixer for a period of between 5 minutes and 4 hours, although longer process times are possible.
4) The resultant residue produced by the shear mixing process can be taken to the next stage immediately or alternatively the material can be left to stand in a container, ideally for 12-14 days although shorter or longer times are possible. Optionally when left to stand a micro-organism (e.g. bacteria or yeast) can be added to the residue, as previously described.
5) Optionally the resultant residue is then filtered and washed with clean water.
6) The residue produced within the previous stage is then mixed with a bleaching solution ideally of the concentration 0.5% and is allowed to stand for up to 15 hours. This ensures that an effective quantity of pectins and hemicellulose present within the original carrot material is dissolved within the resultant solution.
7) A number of options are available at this stage. The first option is to remove the bleach by filtering and washing the resultant solution. Optionally, if further reduction in the particle size of the material is desired then further processing of the material can take place either using a high shear mixer or through a high-pressure homogeniser. A final alternative is to initially homogenise the residue and to thereafter remove the bleach by filtering and washing the resultant solution. In practice the resultant biocomposite material appears to relatively independent of the particular order of this step of the process.
8) The water content within the resultant pulp is then reduced, as previously described, so as to provide the required cellulose fragments, which preferably comprises 1%-30% cellulose by weight.

An alternative for forming the hydrophobic polymer emulsion comprises the employment the sample taken of pulp produced from the high pressure homogeniser. This process involves the steps of:

1) Passing the sample through the homogeniser a number of times so as to reduce the cellulose fragments to individual cellulose fibrils and microfibrils. This material is then retained in liquid form.
2) The epoxy particles are then mixed directly with this liquid so as to produce an emulsion comprising the epoxy particles and the cellulose fibrils and microfibrils. Similar ratios to those previously described are again employed.

An alternative for forming the hydrophilic polymer solution comprises the employment of the sample taken of the pulp from the homogeniser. This process involves the step of:

1. Passing the sample through the homogeniser a number of times so as to reduce the cellulose fibrils and microfibrils. This material is retained in the liquid form.
2. The hydrophilic polymer (e.g. PVA) is then mixed directly with this liquid to form a solution comprising PVA particles and the cellulose fibrils and microfibrils. This is then used as previously described.

A number of examples of uses of the described biocomposite materials 1 shall now be described.

In the first instance the biocomposite material 1 can be used to produce a monolithic structure 6 through which the mechanical properties are graded. Essentially a multi layer structure can be formed within which there exist no internal interfaces to compromise the overall structure. This is achieved by laying down a layer of the uncured material with the correct formulation for the mechanical properties required (this layer can be several mm thick) before a second layer of uncured material with a different mechanical property is laid down on top of the first. Repeating this step a number of times results in structure with different mechanical properties layers. Once the required number of layers has been reached the composite material is then pressed and cured to form the monolithic structure 6, as appropriate. It will be readily apparent that each of the layers may in fact exhibit the same, or similar, mechanical properties.

By way of example this method can be employed to produce a ski in which an extremely tough layer 7 is initially prepared, upon which a stiffer layer 8 is then laid, followed by a layer of intermediate properties 9 at the core with a layer of stiff 8 and then tough material 7 completing the structure. Such a structure is presented schematically in FIG. 5.

Alternatively, the biocomposite material 1 can be used within a more conventional lamination process so as to form a laminate structure 10, see FIG. 6. The laminate structure 10 can be employed to produce thick flat items such as skis, snow boards, surf boards, skate boards etc or tubular items such as fishing rods, bicycle frames, ski poles, sail spars, masts etc. This is achieved by dipping pre-formed sheets of the biocomposite material 1 in a hydrophobic resin 11, stacking the sheets on top of one another and thereafter pressing under high pressure. When the hydrophobic resin 11 has cured the laminate structure 10 is removed from the press and if necessary given an extra coating surface of a finishing material.

It will be apparent to those skilled in the art that the laminate structure 10 may comprise one or more layers of materials already known in the art e.g. plastics and/or carbon fibre reinforced plastic materials. A known problem of prior art laminate structures that comprise carbon fibre reinforced plastic materials is the large difference in stiffness between the fibres and plastic. Carbon fibres have Young's modulus in the range 150-600 GPa where as plastic materials such as epoxy resin, typically have moduli of between 2-8 GPa. This can cause problems of delamination when different layers of carbon fibre composites are bonded together with resins. Furthermore, it also means that unidirectional carbon fibre materials have very low stiffness and strength at right angles to the fibre direction.

Incorporation of one or more layers of the biocomposite material 1 provides a means for alleviating this problem. The advantage of using the biocomposite material to form the laminate structure is that it can increase stiffness, strength and toughness in certain directions, for certain orientations of the layers. For example a laminate made from a layer of unidirectional carbon fibres in epoxy resin and a layer of biocomposite material has higher stiffness and strength, when tested in tension in the direction of the carbon fibre axis, than a laminate made from two layers of carbon-epoxy with fibre directions at right angles. Although the stiffness is lower when the laminate is tested in tension at right angles to the carbon fibre axis, the stiffness in this direction is still more than adequate for certain applications e.g. hollow tubular rods where the highest stiffness is required along the axis of the rod, with just sufficient stiffness and strength in the hoop direction to prevent crushing and ovalisation during mechanical loading of the rod.

The above described laminate structure may be formed in a number of ways. The first method comprises applying a layer of biocomposite paste to a pre-cured layer of high stiffness fibre reinforced composite. The biocomposite paste layer is then dried and cured by heating. Pressure need not be applied to the laminate during curing, but can be advantageous in reducing imperfections in the cured biocomposite. Several layers can be built up by this method (e.g. composite/paste/composite/paste) before drying and curing, or each paste layer can be cured first before the addition of further layers.

An alternative method involves applying an uncured high stiffness fibre reinforced plastic to a layer of cured biocomposite material 1. The high stiffness fibre reinforced plastic is then cured. Pressure may need to be applied to the laminate during curing. Several layers can be again built up employing this method (e.g. paste/composite/paste/composite) before drying and curing, or each paste layer of paste and composite can be cured first before the addition of further layers.

A further alternative method comprises the pressing of layers of precured biocomposite material 1 and high stiffness fibre reinforced plastic together with an adhesive. Pressure is sustained until the adhesive has cured.

The biocomposite material 1 is also found to increase the toughness of carbon fibre structures when applied as a surface finish i.e. a lamination of carbon fibre-biocomposite. This is because certain formulations of the biocomposite material 1 have higher failure strains than the carbon fibre, while still retaining good strength.

A further example application of the biocomposite material 1 is in the production of tubular sections which are suitable for use within a fishing rod. The biocomposite material 1 is initially prepared as described above. Before curing however the biocomposite material 1 is placed into a porous mould or a mould which contains a porous liner (e.g. ceramic, clay or open celled foam) and formed round a waxed tapered mandrel of the required dimensions. The biocomposite material 1 is then air dried to remove water. Next the tapered tube of the biocomposite material 1 is removed from the mandrel and preferably heated to a temperature of around 120° C. Finally the tube is post cured at temperatures of up to 180° C.

The biocomposite material described above exhibits several unique features over those materials described in the prior art. In the first instance the biocomposite material exhibits stiffness and tensile strength parameters that are favourably comparable with any previously described material. In addition these parameters are achieved without any compromise on the toughness of the material and so the described composite material is not brittle like many of the previously described biocomposite materials. Typically the composite materials produced exhibit a bending strength in the range of 60 MPa to 600 MPa.

Furthermore, the described material has the significant advantage that it is also impermeable to water so allowing its range of applications to be extensively increased. In particular, the described material may be employed to produce skis, snow boards, surf boards, skate boards etc or tubular items such as fishing rods, bicycle frames, ski poles, sail spars, masts. However it is envisaged that wherever there is a requirement for a strong flat material, that is impermeable to water, then the described biocomposite material would provide an ideal solution.

Since the described extraction process of cellulose fragments from the plant material requires relatively little energy the method of manufacture is more amenable to be employed on a commercial scale. In addition, the manufacturing process is less complex than those previously described in the art to produce composites from wood fibres or bacterial cellulose. A particular advantage to the described method is that it does not require the employment of an organic solvent.

As a result a new composite material with a unique combination of physical properties has been produced from a sustainable resource and manufactured by a relatively low energy, non polluting process. In fact the biocomposite material produced appears to be many times tougher than any waterproof cellulose based composite produced to date.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

TABLE 1

| Material | Stiffness (Young's Modulus GPa) | Tensile Strength (MPa) | Toughness (Energy Absorbed to failure MJm$^{-3}$) |
|---|---|---|---|
| Biocomposite Material | 18 | 250 | 10 |
| GFRP e.g. Chopped Strand Mat | 12 | 160 | 4 |
| Waterproof Hemp (30% Polypropylene fibre content | 7 | 50 | 1 |

The invention claimed is:

1. A biocomposite material comprising:
   a plurality of cellulose fragments comprising a network of cellulose microfibrils;
   a hydrophilic binder located within the network of cellulose microfibrils, and
   a hydrophobic binder arranged to interact with the hydrophilic binder so as to encapsulate the plurality of cellulose fragments, wherein the hydrophilic binder comprises a hydrophilic or substantially hydrophilic polymer selected from a member of the group consisting of an acrylic resin, a partially hydrolyzed polyvinyl acetate, gelatine and guar gum wherein the material exhibits a tensile strength in the range from 60 MPa to 1 GPa.

2. A biocomposite material as claimed in claim 1, wherein the material exhibits a stiffness in the range from 5 GPa to 90 GPa.

3. A biocomposite material as claimed in claim 1, wherein the cellulose fragments are arranged in a randomly orientated manner.

4. A biocomposite material as claimed in claim 1, wherein the material exhibits a bending strength in the range from 60 MPa to 600 MPa.

5. A biocomposite material as claimed in claim 1, wherein the material exhibits a toughness in the range from 3 MJm-3 to 10 MJm-3.

6. A biocomposite material as claimed in claim 1, wherein the hydrophobic binder comprise a hydrophobic polymer.

7. A biocomposite material as claimed in claim 6, wherein the hydrophobic polymer comprises an epoxy.

8. A biocomposite material as claimed in claim 1, wherein the hydrophobic polymer comprises a binder selected from the group consisting of polyurethanes, phenolic resins, acrylics and siloxanes.

9. A monolithic structure comprising two or more layers wherein at least one of the two or more layers comprise a biocomposite material as claimed in claim 1.

10. A laminate structure comprising two or more layers wherein at least one of the two or more layers comprise a biocomposite material as claimed in claim 1.

11. A laminate structure as claimed in claim 10, wherein the structure further comprises one or more layers of resin located between the two or more layers.

12. A laminate structure as claimed in claim 11, wherein the one or more layers of resin comprise a hydrophobic resin.

13. A laminate structure as claimed in claim 12, wherein the hydrophobic resin comprises epoxy or polyurethane.

14. A tube, suitable for use in a fishing rod, the tube comprising a biocomposite material as claimed in claim 1.

15. A biocomposite material as claimed in claim 5, wherein the hydrophilic polymer comprises hemicellulose.

16. A biocomposite material as claimed in claim 5, wherein the hydrophilic polymer comprises a biological hydrophilic polymer.

17. A biocomposite material as claimed in claim 1 wherein x is within the range of from 0.15 to 0.55.

18. A biocomposite material as claimed in claim 1 wherein the material has the general formulation:

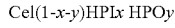

Cel(1-$x$-$y$)HPI$x$ HPO$y$ where x is within the range of from 0.05 to 0.55 and y is within the range of from 0.05 to 0.65, and x and y quantify the percentage by weight of the hydrophilic binder and hydrophobic binder present within the material, respectively.

19. A biocomposite material as claimed in claim 1 wherein the biocomposite material is obtainable by a process comprising the steps of
   (i) producing a plurality of cellulose fragments comprising a network of microfibrils;
   (ii) incorporating a hydrophilic binder within the network of cellulose microfibrils; and
   (iii) encapsulating the cellulose fragments and the hydrophilic binders with a hydrophobic binder.

20. A biocomposite material as claimed in claim 19 wherein the step of incorporating the hydrophilic binder within the network of cellulose microfibrils comprises rehydrating the cellulose fragments with a first emulsion comprising the hydrophilic binder so as to produce a paste; and removing excess water and excess hydrophilic binder from the paste.

* * * * *